March 2, 1965  B. S. ZIEG  3,172,110
LOOP-COUPLED HF AIRCRAFT ANTENNA
Filed April 21, 1961
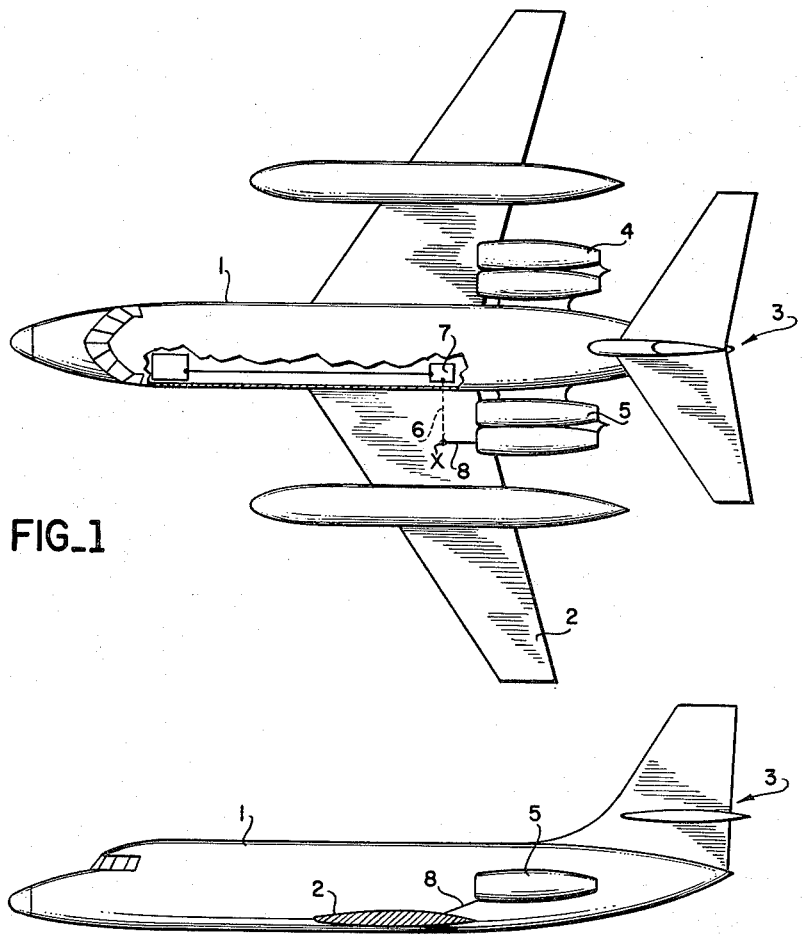
FIG_1
FIG_2
*INVENTOR.*
BENJAMIN S. ZIEG
BY
Agent 3,172,110
LOOP-COUPLED HF AIRCRAFT ANTENNA
Benjamin S. Zieg, Smyrna, Ga., assignor to Lockheed
 Aircraft Corporation, Burbank, Calif.
Filed Apr. 21, 1961, Ser. No. 104,631
4 Claims. (Cl. 343—708)

This invention relates to a high frequency antenna system and more particularly to a loop-coupled aircraft antenna.

Long wire antennas have in general been accepted as the most satisfactory element for aircraft installation and the like. There are however conditions in which the long wire antenna is not practical, a few of which are (1) high speed aircraft, (2) aircraft of the so-called flying tail, and (3) aircraft wherein the jets are mounted on the fuselage rearwardly of the main wing structure.

For example, at the higher cruising speeds long wire antennas are unstable and the aerodynamic drag is excessive. A system which would take up slack in the wire during trim of the so-called flying tail would be too heavy, complicated and expensive. In addition, with the rear mounted engine nacelles on the fuselage, a break in the long wire could result in engine ingestion of the wire antenna creating a serious inflight safety problem.

An object of this invention is to provide an aircraft communication antenna which eliminates one or more of the above disadvantages.

Another object of this invention is to provide an antenna loop for efficient excitation of the airframe.

Another object of this invention is to provide a high frequency radio communication antenna having a sensitivity comparable to the long wire.

A further object of the invention is to provide a radio communication antenna having low drag characteristics and having an increased system reliability.

A further object of the invention is to provide a grounded condition of the antenna which eliminates any need for lightning protection.

These and additional and various objects will be readily appreciated from a consideration of the accompanying detailed specification and the attached drawings in which:

FIGURE 1 is a plan view of an aircraft showing an antenna installed in accordance with one embodiment of the present invention.

FIGURE 2 is a horizontal profile of the aircraft shown in FIGURE 1 utilizing the present invention.

An HF (high frequency) antenna on an airplane is merely a method of coupling power into the airframe which then becomes the primary antenna. The point at which this excitation is coupled into the airframe has a profound effect on the radiation pattern as well as the polarization of the radiated signal. For example, the tail cap and probe type antennas exciting the vertical fin of the airplane have predominantly vertical polarization, while the wing cap and long wire antennas will generally be horizontally polarized. The proposed antenna for an airplane with aft mounted nacelles couples power inductively into the airframe rather than capacitively as in the case of the isolated sections. The physical arrangement of the coupling loop causes predominantly horizontal polarization at the low frequencies and near equal distribution between horizontal and vertical polarization on the higher frequencies.

With reference to FIGURE 1, an aircraft is shown having a fuselage 1 with the conventional main airfoil 2 and tail surfaces 3. The propulsion plants consist of nacelles 4 and 5 arranged on either side of the fuselage near the aft end thereof.

In accordance with the invention a coaxial cable 6 extends from a coupler 7 within the aircraft to a point identified at X on the wing where the braid of the coaxial cable terminates at the skin and the center conductor 8 extends to the skin of nacelle 5. Connections are made within the craft from the coupler to the usual radio equipment.

This forms a loop of the center conductor, nacelle skin, the fuselage and a portion of the wing which couples power into the airframe. The airframe therefore serves as the primary radiator. The pattern measurements indicate signal sensitivities at some frequencies above that of the long wire. At frequencies above the half wave resonance on the airplane, the airframe is excited while the loop loaded by the airframe is predominantly the radiating element at frequencies below half wave length resonance. It is readily seen that the antenna is a D.C. short; however, this configuration exhibits resistance and reactance at all frequencies with a low impedance characteristic throughout the entire frequency band for aircraft communications. In some aircraft installations, the size of the aircraft may be such where the long wire produces better radiation characteristics than the antenna of the present invention, but any such outperformance would be over a relatively narrow portion of the entire aircraft communication frequency band. At all other frequencies the shunt fed nacelle from wing antenna is equal to or superior to the long wire.

It is further realized that dual HF antenna installations can be easily accomplished by providing a likewise arrangement between the other wing and nacelle 4. Likewise, increased radiation pattern control can be accomplished with dual antenna installations when both are connected to coupler 7.

Due to the shorted condition of this type of antenna, the need for lightning protection is of course eliminated, thereby increasing the antenna system reliability. The antenna design also allows the remote installation of the antenna coupler 7 through the cable 6.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What is claimed is:

1. In combination with an aircraft having engine nacelles mounted on the aft fuselage, a high frequency radio antenna comprising a coaxial cable having a center conductor and an outer shielding braid, means connecting said cable to radio equipment within the craft, means terminating the outer braid on the upper wing surface forward of said nacelles, said center conductor extending from said terminating means to the nacelle.

2. In an aircraft having engine nacelles mounted on the rear fuselage, a high frequency antenna comprising a coaxial cable connected at one end to radio equipment within the aircraft, the cable extending through the interior of the wing and to a point on the upper surface of the wing forward of the engine nacelle, means terminating the outer braid of said cable at said point, and means for attaching the exposed center conductor to said engine nacelle.

3. A high frequency antenna for energizing the airframe of an aircraft comprising an airframe having a fuselage, wings and power plant nacelles mounted on the fuselage spatially of the wing, a coaxial cable having the outer shielding braid attached to said wing and the center conductor of said cable extending from said wing to one of said nacelles, and means connecting the free end of said cable to radio equipment.

4. A high frequency antenna for an aircraft having aft mounted nacelles, a coaxial cable having a portion of the center conductor exposed, means mounting the exposed center conductor between the nacelle skin and the upper surface of the aircraft wing, means for attaching the outer conductor to said wing, the coaxial cable extending through said wing and into the aircraft, an antenna coupler connected to the end of said cable and means for attaching said coupler to appropriate radio equipment.

References Cited by the Examiner

UNITED STATES PATENTS

| 2,159,379 | 5/39 | Hyland | 343—705 |
| 2,618,747 | 11/52 | Luck | 343—708 |
| 2,756,423 | 7/56 | Dylewski | 343—705 X |
| 2,934,761 | 4/60 | Kandoian | 343—708 |

FOREIGN PATENTS 766,081  1/57  Great Britain.

HERMAN KARL SAALBACH, *Primary Examiner.*

GEORGE N. WESTBY, *Examiner.*